US010127934B2

(12) United States Patent
Biskeborn et al.

(10) Patent No.: US 10,127,934 B2
(45) Date of Patent: Nov. 13, 2018

(54) DETECTION OF SENSOR-DAMAGING MAGNETIC TAPE RECORDING MEDIA

(71) Applicant: International Business Machines Corporation, Armonk, NY (US)

(72) Inventors: Robert G. Biskeborn, Hollister, CA (US); Ho-Yiu Lam, Mountain View, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/178,393

(22) Filed: Jun. 9, 2016

(65) Prior Publication Data

US 2017/0358319 A1  Dec. 14, 2017

(51) Int. Cl.
| | |
|---|---|
| G11B 5/584 | (2006.01) |
| G11B 5/40 | (2006.01) |
| G11B 5/008 | (2006.01) |
| G11B 5/55 | (2006.01) |
| G11B 27/36 | (2006.01) |

(52) U.S. Cl.
CPC ............ G11B 5/40 (2013.01); *G11B 5/00813* (2013.01); *G11B 5/5504* (2013.01); *G11B 5/5508* (2013.01); *G11B 5/584* (2013.01); *G11B 27/36* (2013.01)

(58) Field of Classification Search
None
See application file for complete search history.

(56) References Cited

U.S. PATENT DOCUMENTS

| | | | | |
|---|---|---|---|---|
| 6,046,871 | A * | 4/2000 | Schaenzer | G11B 5/10 360/122 |
| 6,249,890 | B1 | 6/2001 | Ukani et al. | |
| 6,305,629 | B1 * | 10/2001 | Chliwnyj | G11B 5/584 242/334.1 |
| 6,359,433 | B1 | 3/2002 | Gillis et al. | |
| 7,277,246 | B2 | 10/2007 | Barbian et al. | |
| 7,493,234 | B2 * | 2/2009 | Greco | G06F 11/3409 360/31 |
| 7,554,759 | B2 | 6/2009 | Gill et al. | |
| 8,089,714 | B2 | 1/2012 | Shitara et al. | |
| 8,570,678 | B2 | 10/2013 | Brong et al. | |
| 9,013,827 | B1 * | 4/2015 | Bui | G11B 15/1883 360/77.12 |
| 9,607,635 | B1 * | 3/2017 | Biskeborn | G11B 5/3912 |

(Continued)

*Primary Examiner* — Tan X Dinh
(74) *Attorney, Agent, or Firm* — Zilka-Kotab, P.C.

(57) ABSTRACT

A computer-implemented method for detecting sensor-damaging tape media, according to one embodiment, includes acquiring a metric for at least one sensor of a tape drive after performing an operation on a magnetic recording tape, and comparing the metric for the at least one sensor after performing the operation to a metric for the at least one sensor acquired before performing the operation. An action is taken in response to a result of the comparing indicating that a difference between the metrics is in a predetermined range. A product, according to one embodiment, includes a magnetic recording tape, and a memory coupled to the magnetic recording tape. At least one value is stored in the memory, the at least one value being indicative of whether the magnetic recording tape is potentially sensor-damaging.

20 Claims, 9 Drawing Sheets

(56) References Cited

U.S. PATENT DOCUMENTS

| | | | |
|---|---|---|---|
| 9,653,114 B1* | 5/2017 | Biskeborn | G11B 20/1816 |
| 9,658,784 B1* | 5/2017 | Ahmad | G06F 3/0616 |
| 9,761,272 B1* | 9/2017 | Biskeborn | G11B 20/1816 |
| 2004/0153205 A1* | 8/2004 | Goodman | G11B 15/689 |
| | | | 700/214 |
| 2006/0098351 A1* | 5/2006 | Iben | G11B 5/40 |
| | | | 360/323 |
| 2007/0016742 A1* | 1/2007 | Goodman | G06F 21/6227 |
| | | | 711/163 |
| 2012/0320470 A1* | 12/2012 | Thompson | G11B 15/68 |
| | | | 360/15 |
| 2014/0063638 A1* | 3/2014 | Ahmad | G11B 5/00813 |
| | | | 360/66 |
| 2015/0255093 A1* | 9/2015 | Biskeborn | G11B 20/10305 |
| | | | 369/53.38 |
| 2016/0260449 A1* | 9/2016 | Ahmad | G11B 5/584 |

* cited by examiner

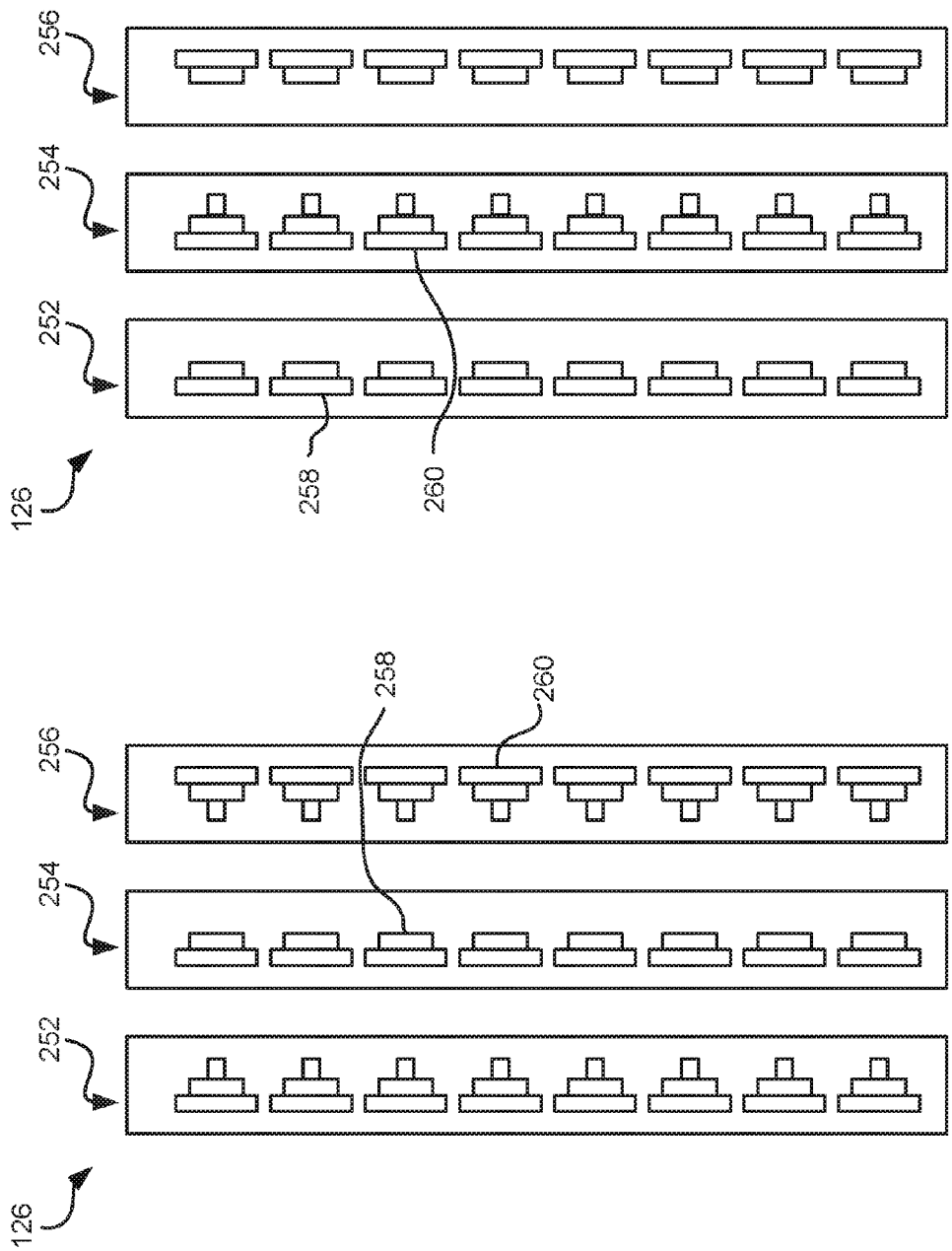

DETECTION OF SENSOR-DAMAGING MAGNETIC TAPE RECORDING MEDIA

BACKGROUND

The present invention relates to data storage systems, and more particularly, this invention relates to the detection of sensor-damaging magnetic tape recording media.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

A computer-implemented method for detecting sensor-damaging tape media, according to one embodiment, includes acquiring a metric for at least one sensor of a tape drive after performing an operation on a magnetic recording tape, and comparing the metric for the at least one sensor after performing the operation to a metric for the at least one sensor acquired before performing the operation. An action is taken in response to a result of the comparing indicating that a difference between the metrics is in a predetermined range.

A computer program product for detecting sensor-damaging tape media, according to one embodiment, includes a computer readable storage medium having program instructions embodied therewith, wherein the computer readable storage medium is not a transitory signal per se, the program instructions executable by a processing circuit to cause the processing circuit to perform the foregoing method.

A product, according to one embodiment, includes a magnetic recording tape, and a memory coupled to the magnetic recording tape. At least one value is stored in the memory, the at least one value being indicative of whether the magnetic recording tape is potentially sensor-damaging.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method for detecting sensor-damaging tape media includes acquiring a metric for at least one sensor of a tape drive after performing an operation on a magnetic recording tape, and comparing the metric for the at least one sensor after performing the operation to a metric for the at least one sensor acquired before performing the operation. An action is taken in response to a result of the comparing indicating that a difference between the metrics is in a predetermined range.

In another general embodiment, a computer program product for detecting sensor-damaging tape media includes a computer readable storage medium having program instructions embodied therewith, wherein the computer readable storage medium is not a transitory signal per se, the program instructions executable by a processing circuit to cause the processing circuit to perform the foregoing method.

In yet another general embodiment, a product includes a magnetic recording tape, and a memory coupled to the magnetic recording tape. At least one value is stored in the memory, the at least one value being indicative of whether the magnetic recording tape is potentially sensor-damaging.

Figure 1A:
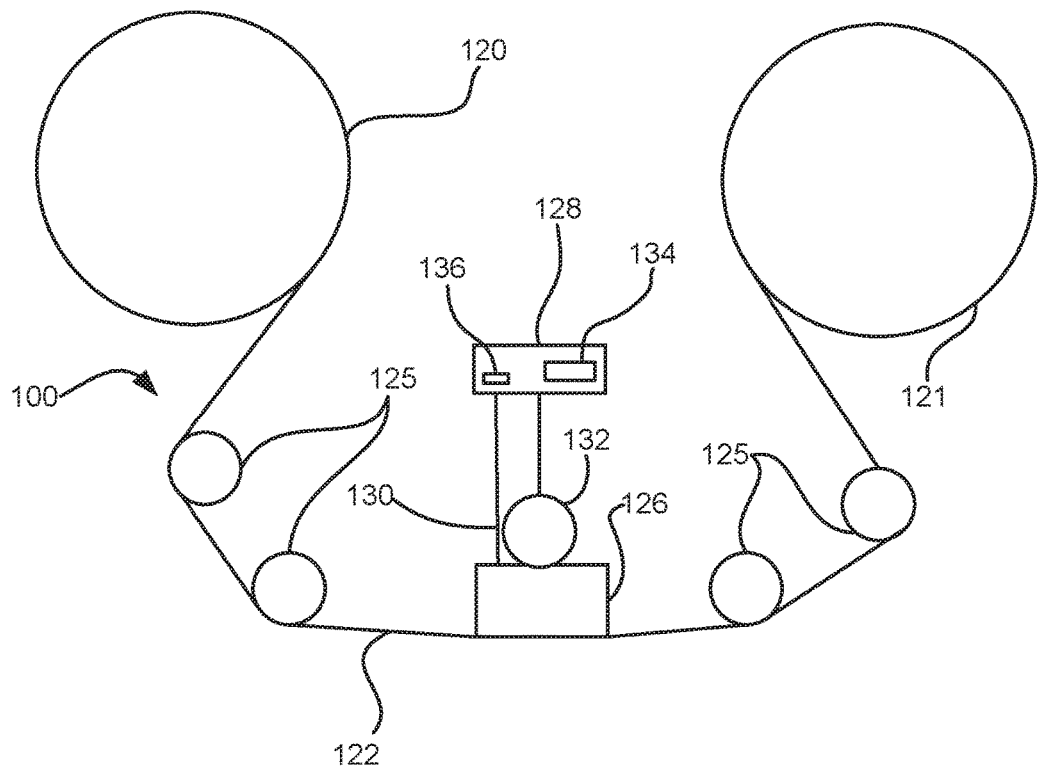
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
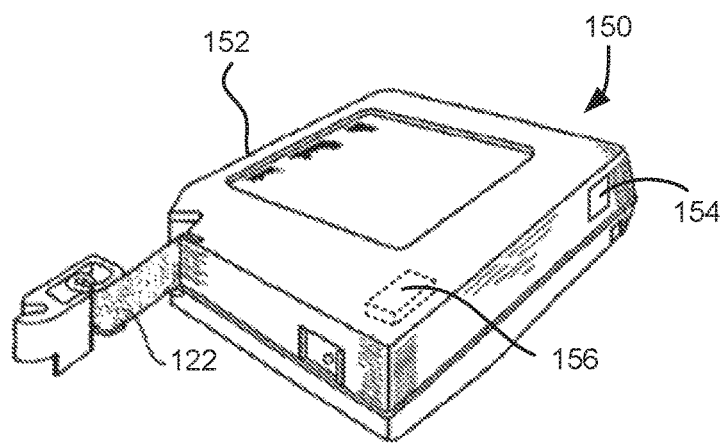
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
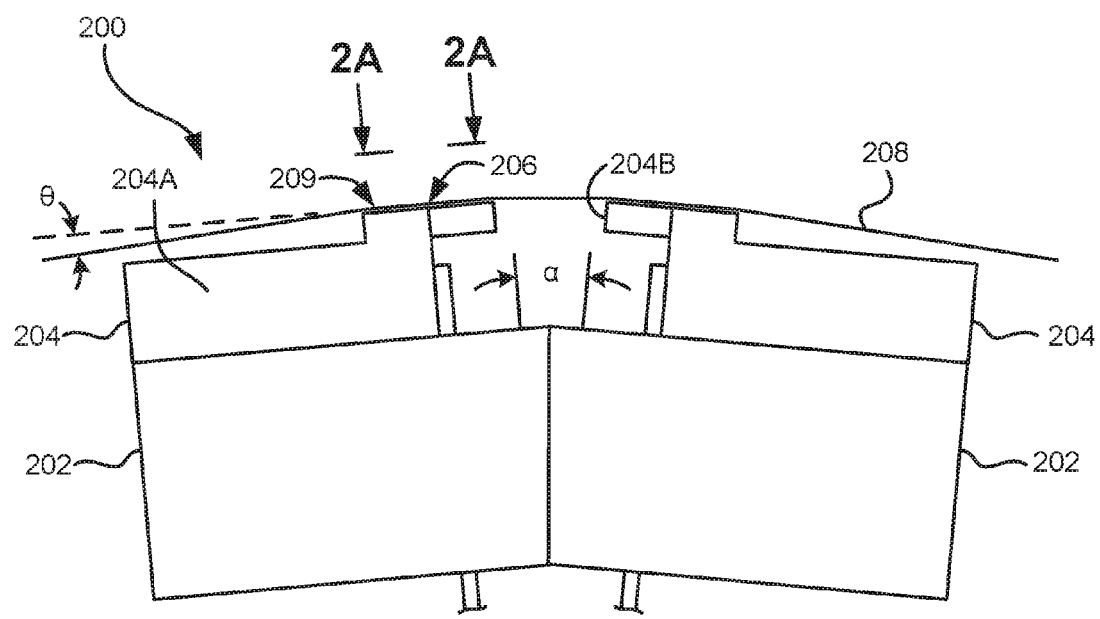
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
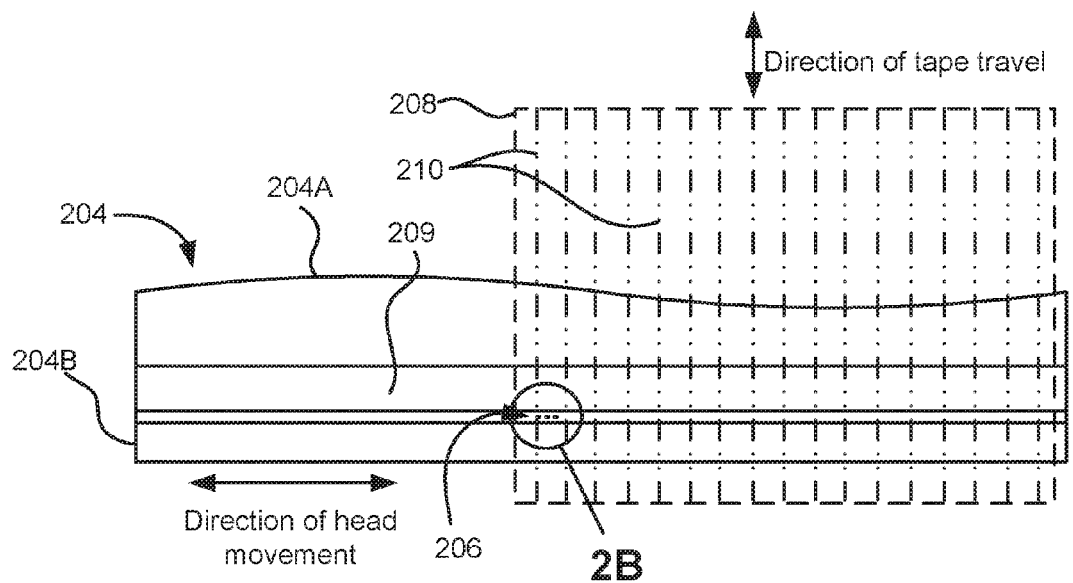
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
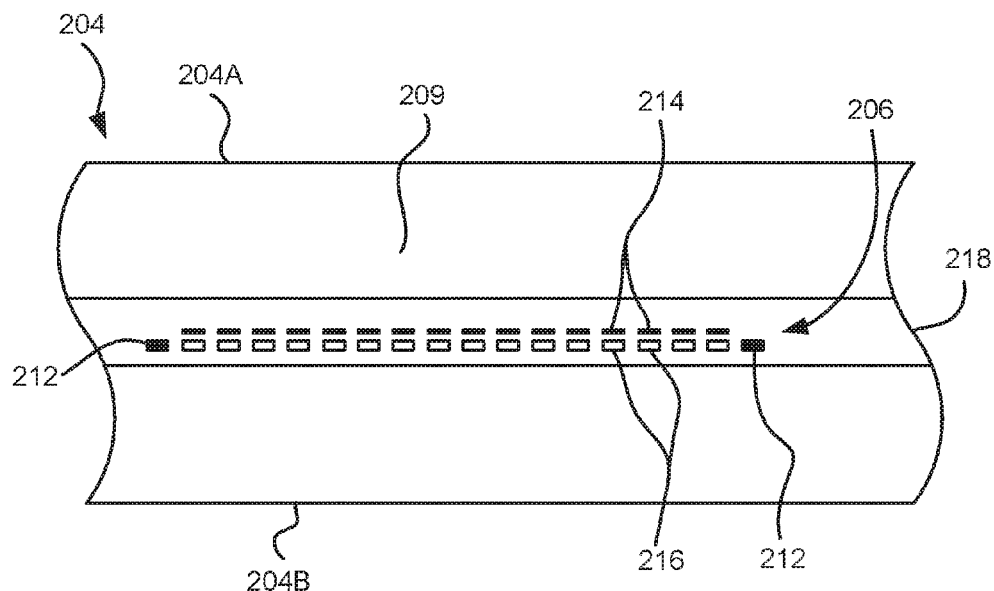
FIG. 2B is a detailed view taken from Circle 2B of FIG. 2A.

FIG. 2B depicts a plurality of readers and/or writers 206 formed in a gap 218 on the module 204 in Circle 2B of FIG.

2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
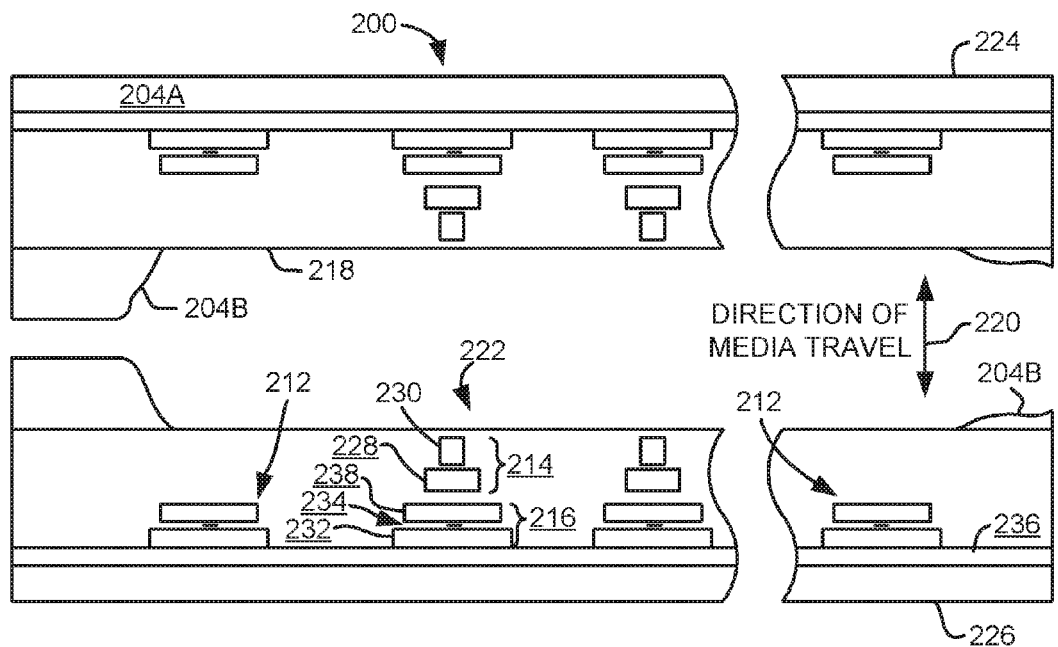
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
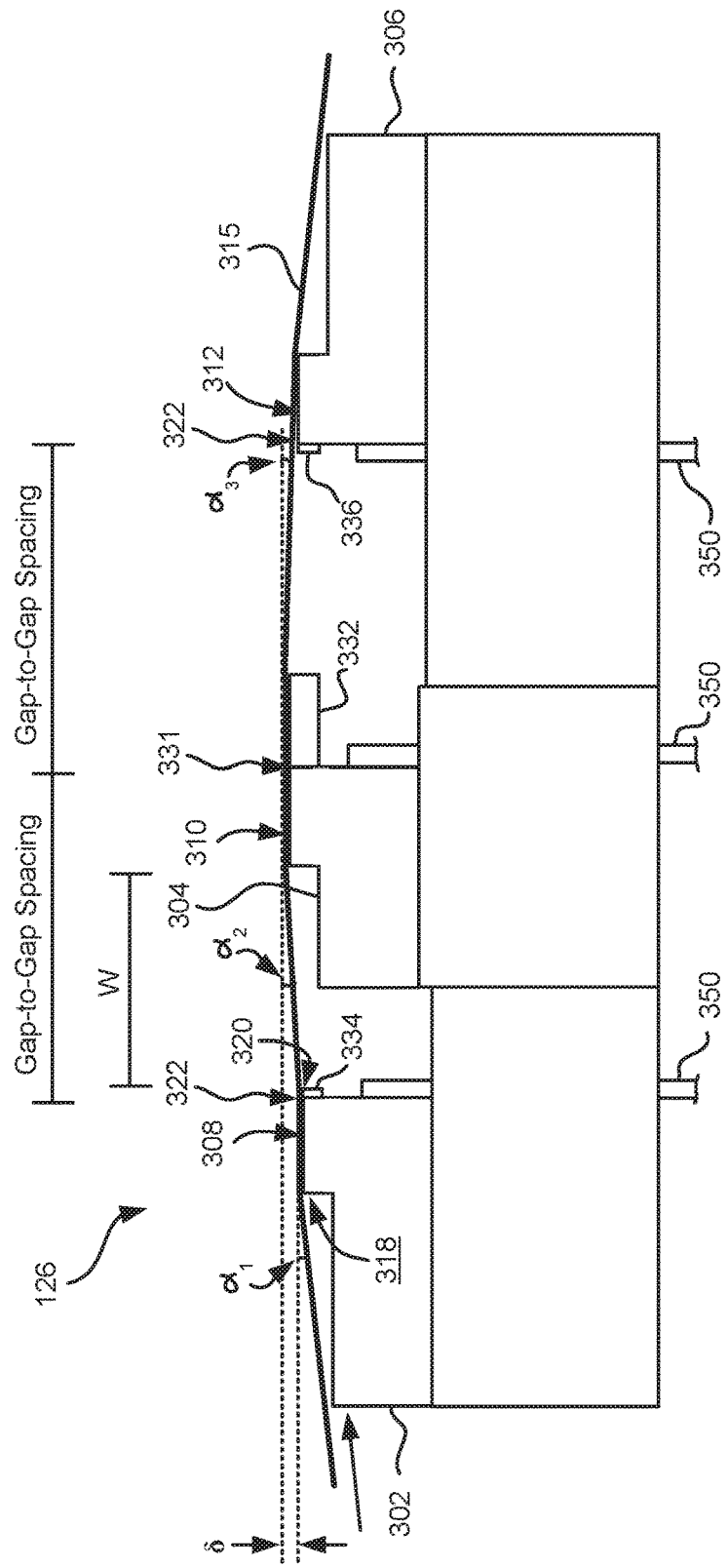
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
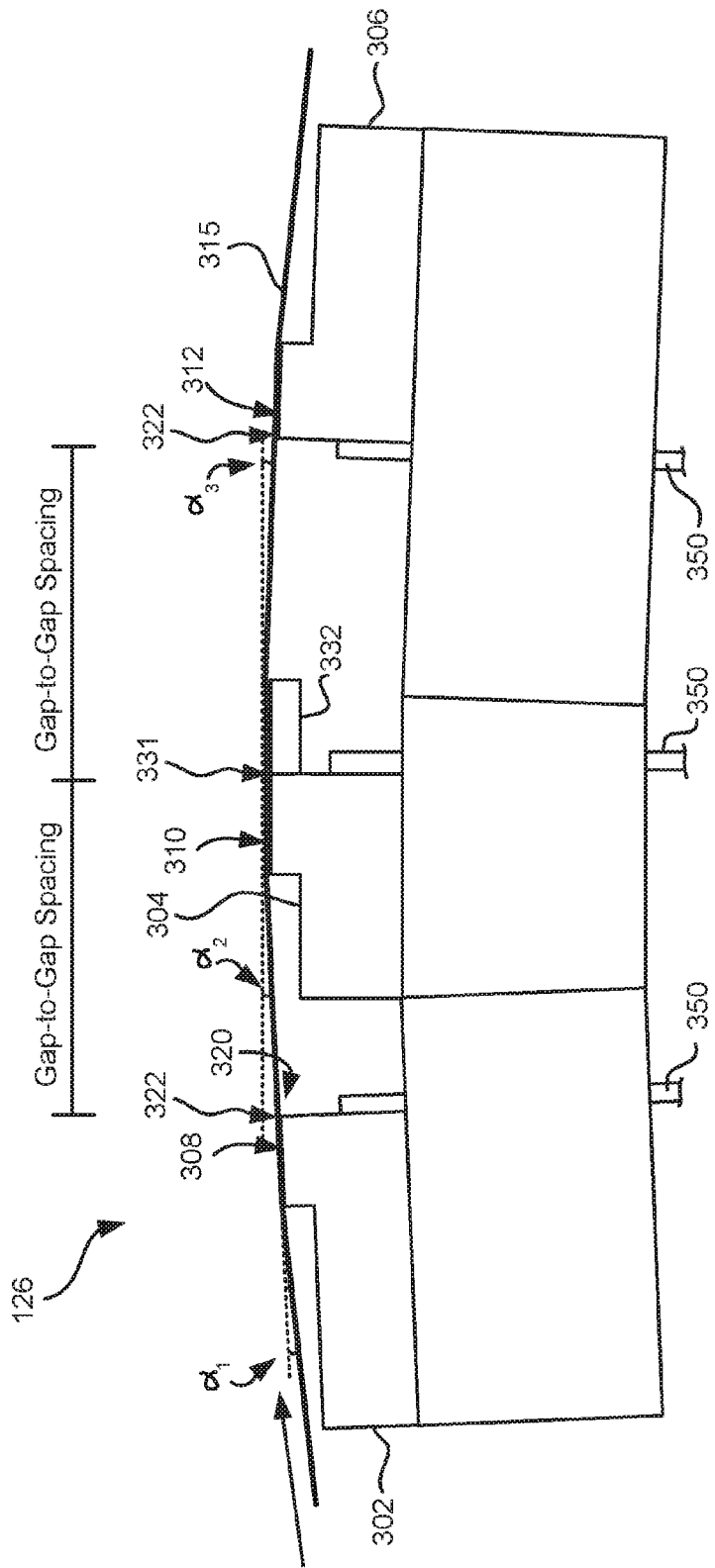
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
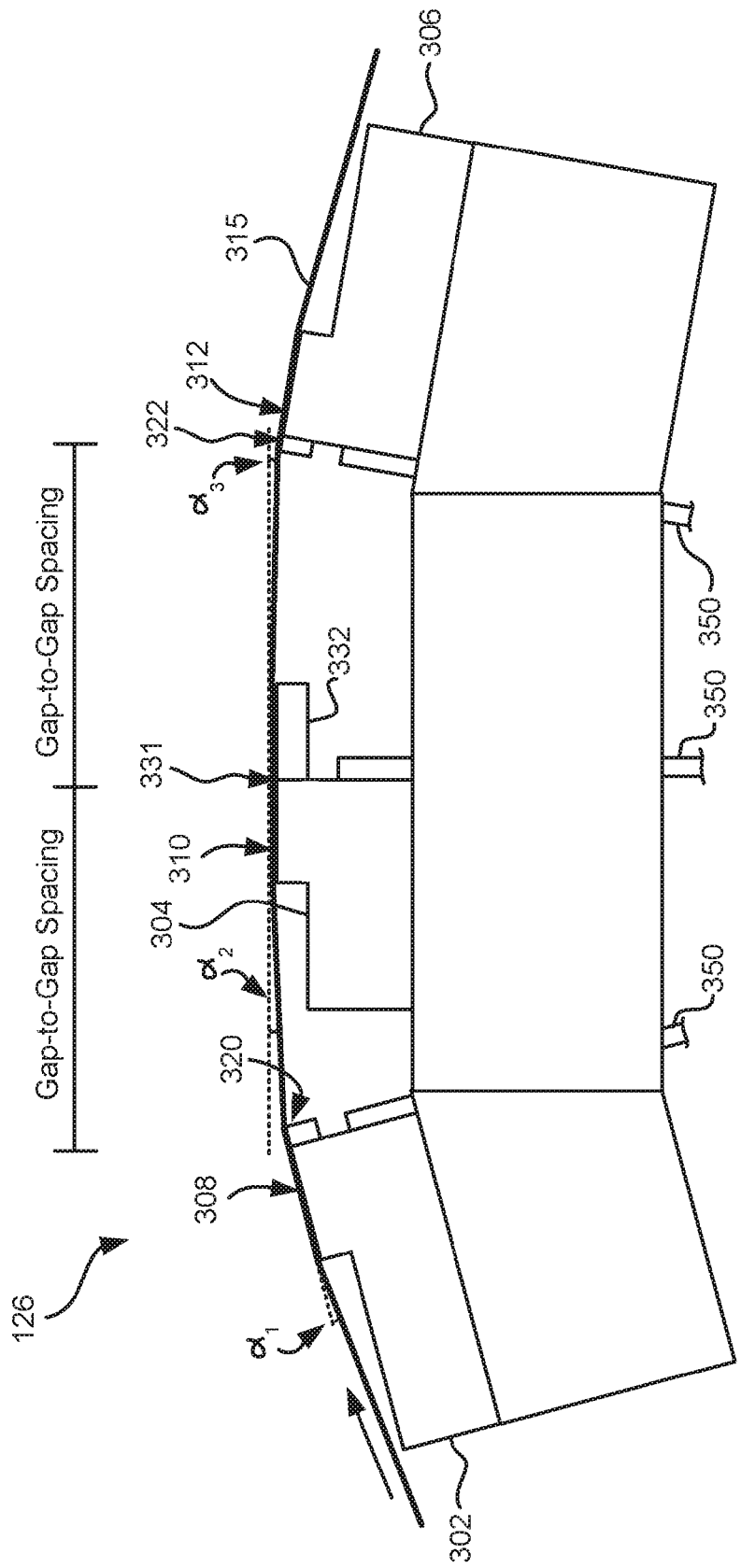
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Servo pattern and data read sensors may experience shorting failures during normal data writing and/or reading operations. Particularly, such shorting may be caused by defects (herein "defects") that protrude from the magnetic tape recording media (also generically referred to as "tape"), such as agglomerations of for example abrasive nonmagnetic particulates and/or binder materials; or other defects, e.g., hard particulates, that protrude from the tape surface. For example, as is well known for tape media in particular, larger foreign particles, e.g., remnants of alpha-hematite production, may be present in a layer or layers of the media. Such defects may be in the form of a particle (solid or agglomeration) that has a dimension, e.g., diameter or length along most distant points thereof, that is at least twice as great as an average diameter of the particles in the layer having similar materials, e.g., smaller particles similar to those that have agglomerated to form the defect. In some cases, the defect may have a dimension that is greater than a thickness of the layer and so is the source of the defect.

Whatever the source or composition, such defects, when protruding from the upper surface of the medium, may smear and/or plow conductive material from the thin films of the reader across the sensor, thereby creating an electrical short.

While this issue is relevant to both current-in-plane and more particularly to current-perpendicular-to-plane (CPP) readers in general, this problem is particularly problematic with CPP TMR sensors. Because the deposition thickness of the tunnel barrier the TMR sensor is very thin, e.g., less than about 10 angstroms in some approaches, smearing of conductive material thereacross is a pervasive problem. Accordingly, TMR sensors may be particularly susceptible to such shorting due to the thin sensor barrier.

Interactions between tape media surface defects and a sensor surface may also lead to friction-related functionality issues. For example, when a surface defect passes over a sensor, friction may lead to plastic deformation of one or more delicate thin films of the sensor. Plastic deformation of the delicate thin films may alter the stress distribution inside the sensor, and this may be presented as noise due to magnetic instability, e.g., switching magnetic domains.

Narrower write heads may also be subject to degradation via spacing loss resulting from gouges caused by tape surface defects.

Such surface defects may result from, e.g., the milling of particles used in the manufacturing process of the tape, e.g., where a large particle becomes captured in a coating of the tape media during manufacture; a manufacturing defect during any known manufacturing process, such as creation of an agglomerate of particulates or binder that protrudes from the media; etc.

The surface quality of tape media may vary greatly from tape to tape, e.g., depending on the vendor generation, depending on the production lot, depending on the other environmental factors, etc. Accordingly, while some measures may be taken to deal with defects in general, tape media with large defects may have a pronounced effect on tape drive operation. For example, tape media with large defects may damage one or more sensors during the initial writing process, where such damage may be resistance reduction, loss of amplitude, increase in bit error rate, etc. Moreover, the cartridge might then be inserted into multiple companion drives in a library during subsequent write and read attempts. This may result in shorting in multiple drives and lead to a critical situation.

Various embodiments described herein include the detection of sensor-damaging magnetic tape recording media, e.g., where the detection may be used to prevent the detected sensor-damaging magnetic tape recording media from damaging magnetic recording tape drives.

Figure 8:
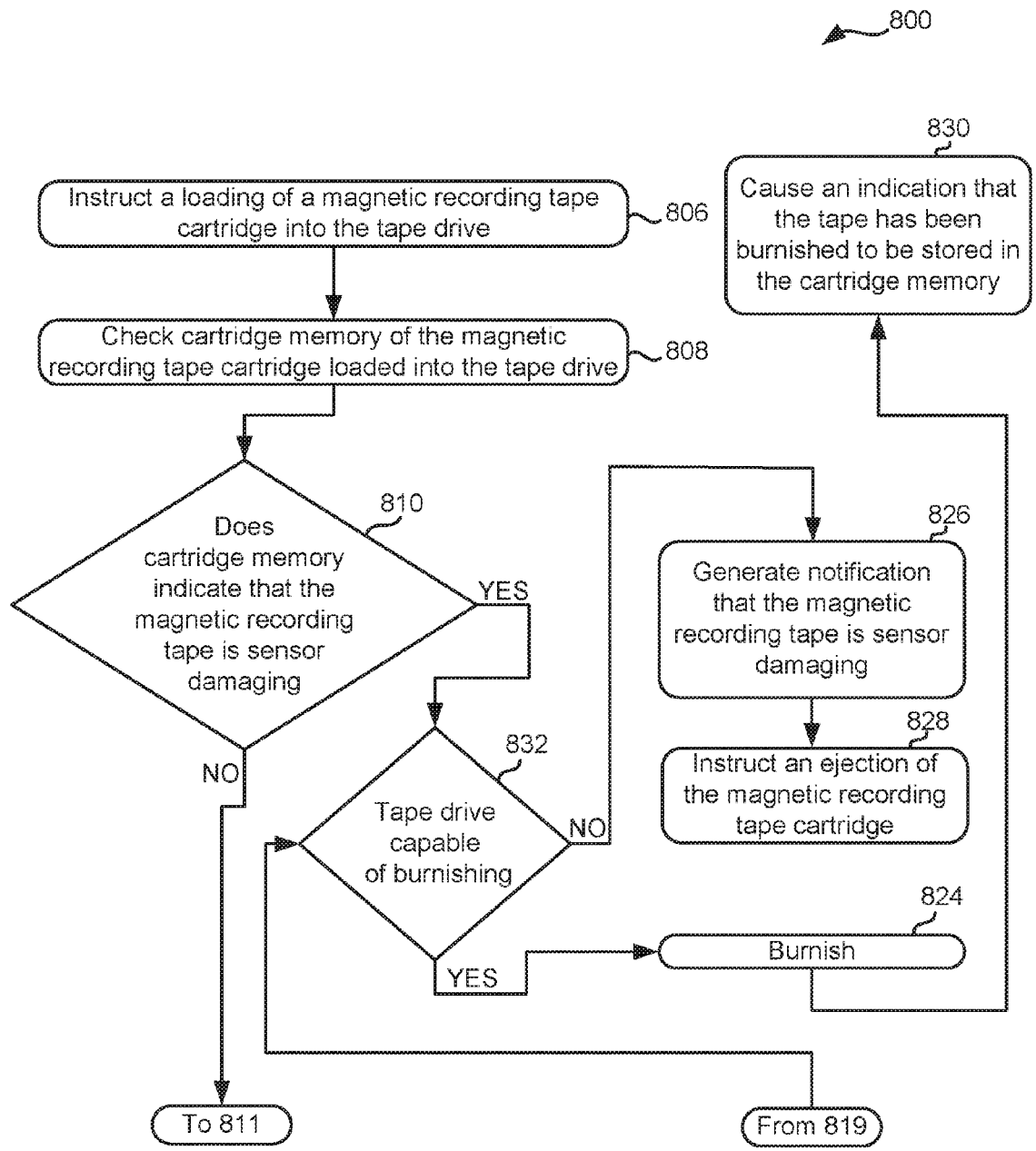
FIG. 8 is a flowchart of a method, in accordance with one embodiment.
Figure 8:
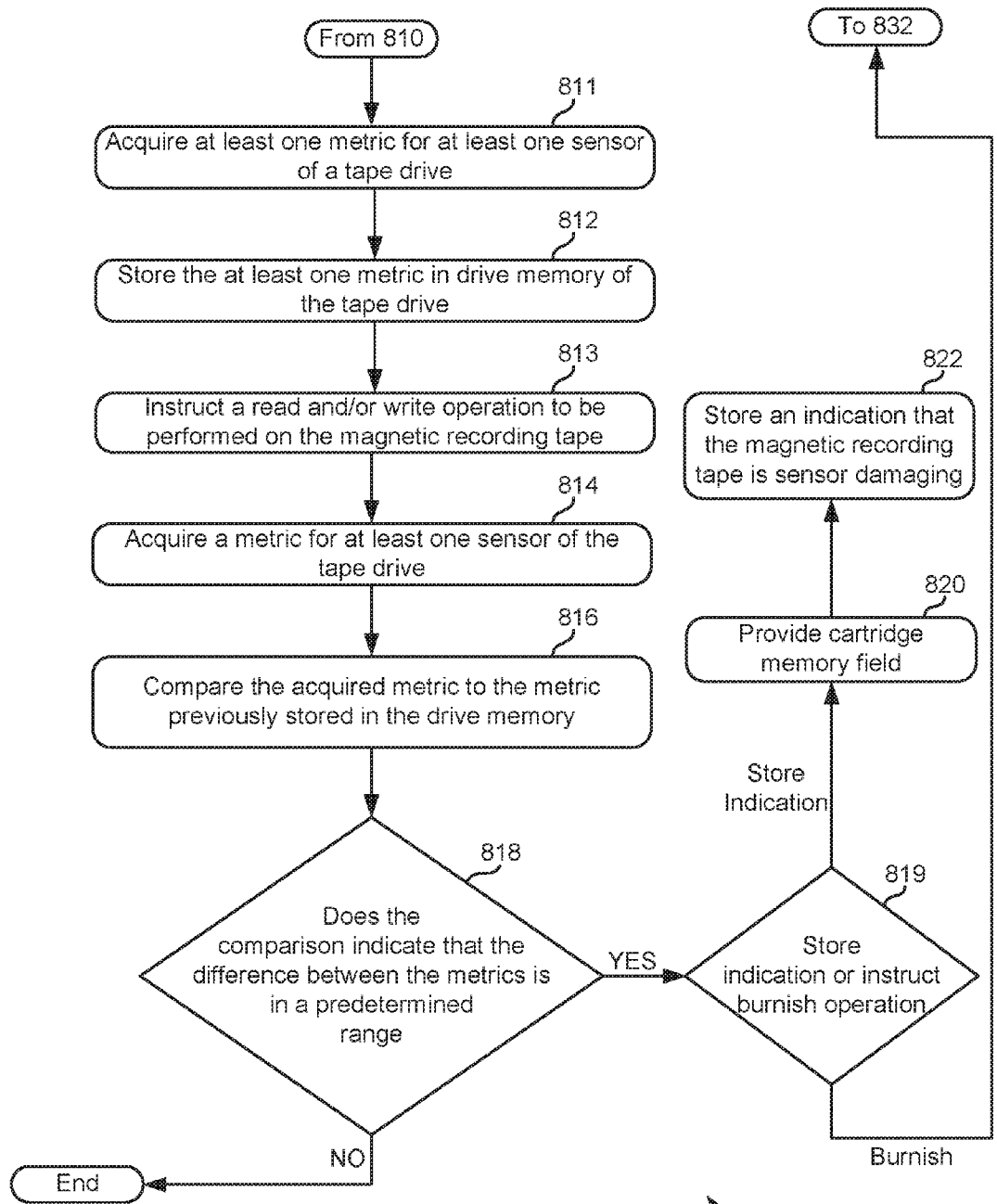

Now referring to FIG. 8, a flowchart of a method 800 is shown according to one embodiment. The method 800 may be performed in accordance with the present invention in any of the environments depicted in FIGS. 1-2, 5, 6, 7, among others, in various embodiments. Of course, more or less operations than those specifically described in FIG. 8 may be included in various permutations of method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

Method 800 of FIG. 8 includes an illustrative method for detecting sensor-damaging tape media, e.g., of a tape cartridge, to prevent damage in tape drives. Such drives may be considered computers according to various embodiments. The operations of method 800 are disclosed for purposes of an example, and should not be interpretively limited thereto.

Operation 806 of method 800 includes instructing a loading of a magnetic recording tape cartridge into a tape drive. The magnetic recording tape may or may not have any previous use in a tape drive. According to one approach, the magnetic recording tape of the cartridge loaded into the tape drive may have been previously un-used in a tape drive and/or have been recently manufactured. According to another approach, the magnetic recording tape of the cartridge loaded into the tape drive may have been previously used in a tape drive.

Operation 808 of method 800 includes checking a cartridge memory of the magnetic recording tape cartridge loaded in the tape drive. The cartridge memory may be coupled to the magnetic recording tape, e.g., via a cartridge.

At least one value may be stored in the cartridge memory, where the value or values are indicative of whether the magnetic recording tape is potentially sensor-damaging. In one approach, a value may be indicative of whether the tape is presently sensor-damaging. In another approach, a value may be indicative of whether remediation has been performed on the tape. In another approach, both values may be stored in the cartridge memory. It should be noted that a field may be included in the memory for one or more of these values. An empty field in the memory may be considered a null value, and therefore a "value" for purposes of the present description.

Conventional techniques of reading the cartridge memory may be used. Checking the cartridge memory of the magnetic recording tape cartridge loaded in the tape drive may include, e.g., auditing the values of a data list and/or table of the cartridge memory, searching for the most recent value stored in the cartridge memory, searching for the presence of one or more flags in the cartridge memory, etc.

Checking the cartridge memory of the magnetic recording tape cartridge may occur at any time and/or in response to any condition being met.

According to one non-limiting example, the cartridge memory may be checked in response to the magnetic recording tape cartridge being loaded into the tape drive. According to another non-limiting example, the cartridge memory may be checked in response to the magnetic recording tape cartridge being in the tape drive and at least one operation, e.g., a read and/or write operation, being scheduled, e.g., in a controller task queue associated with the tape drive, in the tape drive.

Decision 810 includes determining if the cartridge memory indicates that the magnetic recording tape is sensor-damaging.

An indication that the magnetic recording tape is sensor-damaging may be present in the cartridge memory associated with the magnetic recording tape in response to the magnetic recording tape being previously determined as sensor-damaging. Operations for determining whether or not the magnetic recording tape is sensor-damaging will be described elsewhere herein, e.g., see operations 811-818.

If the cartridge memory indicates that the magnetic recording tape is sensor-damaging, as noted by the "YES" logic extending from decision 810, various embodiments may provide operations to deal with such magnetic recording tape. In one approach, the method may proceed to operation 828 and/or 826, discussed below.

In the embodiment shown, the method proceeds to optional decision 832, where a determination is made as to whether the tape drive is capable of burnishing the magnetic recording tape.

If the tape drive is not capable of burnishing, as noted by the "NO" logic extending from decision 832, the method may proceed to operation 826.

Optional operation 826 includes generating a notification that the magnetic recording tape is or may be currently sensor-damaging. The notification may be generated by, e.g., a controller, a user, a scheduler, etc. In one approach, operation 826 may include creating an indication in cartridge memory that the magnetic recording tape is sensor damaging. In another approach, the generated notification of the indicated sensor-damaging magnetic recording tape may indicate, e.g., to a library controller, a system manager of the tape drive, etc. that the magnetic recording tape is currently sensor-damaging. This notification may indicate, e.g., to a tape library, to a user, etc., that the magnetic recording tape should be scheduled or placed in a queue for burnishing in the present or another magnetic recording tape drive. Examples of burnishing include running the tape through a special tape burnishing drive to blunt down asperities; running the tape in a sacrificial drive for, e.g., a full file pass, to reduce the protrusion of the tape particles; etc.

Optional operation 828, which includes instructing an ejection of the magnetic recording tape cartridge from the tape drive, may be performed. Ejecting the sensor-damaging magnetic recording tape cartridge from the tape drive may free the cartridge slot in the tape drive, e.g., for populating with a non-sensor-damaging and/or any other magnetic recording tape cartridge. The sensor-damaging magnetic recording tape cartridge may also and/or alternatively be ejected so that an action, e.g., a burnishing of the magnetic recording tape, may be taken to mitigate the sensor-damaging defects of the magnetic recording tape, as will now be described below.

Referring again to decision 832, in response to determining that the tape drive is capable of burnishing the magnetic recording tape, as noted by the "YES" logic extending from decision 832, the magnetic recording tape may be burnished in the magnetic recording tape drive, e.g., see operation 824.

Operation 824 includes performing a burnishing operation on the magnetic recording tape that is indicated as sensor-damaging.

The burnishing operation may include mitigating and/or removing one or more defects of the magnetic recording tape. Known burnishing techniques may be used.

According to one approach, the burnishing operation may include passing portions of the magnetic recording tape that include defects over the skiving edges of one or more burnishing blocks any number of times.

According to another approach, the burnishing operation may also and/or alternatively include running, e.g., advancing and/or rewinding the tape, the magnetic recording tape over a sacrificial tape head, e.g., at least one full pass of the entire magnetic recording tape, in a tape drive. In such an approach, the tape drive with the sacrificial head may be designated for burnishing sensor-damaging magnetic recording tape(s), e.g., due to the head wear that the sensor-damaging magnetic recording tapes would likely cause to the sacrificial tape head.

Optional operation 830 includes causing an indication that the tape has been burnished to be stored in the cartridge memory. Such indication may also and/or alternatively be stored in a database in a tape library. The indication may be subsequently used to indicate that the magnetic recording tape has been burnished and therefore may be used for reading and writing operations. In some approaches, operation like operations 811-818 may not need to be performed for such tape, as the burnishing typically mitigates the defects that would cause future damage.

According to one embodiment, the stored indication that the tape has been burnished may provide a precautionary warning, e.g., notifying a management module that checks the cartridge memory that the magnetic recording tape has in the past been determined to be sensor-damaging, to a tape drive management module that selects the tape cartridge for use.

According to another embodiment, causing an indication that the tape has been burnished to be stored in the cartridge memory may include clearing the sensor-damaging indication, e.g., stored in operation 822, from the cartridge memory field.

According to yet another embodiment, the sensor-damaging indication may be relocated from a data field of the cartridge memory field that includes data about the current condition of the magnetic recording tape, to a different data field of the cartridge memory field that includes data about the past condition of the magnetic recording tape. The relocation may, for example, be performed in response to performing operation 830.

Returning to decision 810, in response to determining that the cartridge memory does not indicate that the magnetic recording tape is sensor-damaging, as noted by the "NO" logic extending from decision 810, further operations may be performed to determine whether the magnetic recording tape is sensor-damaging or not, as will now be described below.

Operation 811 of method 800 includes acquiring at least one metric for at least one sensor of the tape drive, e.g., in response to determining that the cartridge memory does not indicate that the magnetic recording tape is sensor-damaging.

The at least one metric may include any measurable metric that may be compared to a later-acquired metric to discern whether damage to a sensor has occurred. Preferably metrics are acquired for each sensor individually, though collective metrics such as averages may be acquired as well.

According to one preferred embodiment, the metric may include a measurement or statistical derivative (e.g., average) of head resistances of the tape drive. According to one approach, the metric may include one or more measures of resistance of the sensor.

According to another embodiment, the metric acquired before performing the operation may correspond to output of the sensors of the tape drive. According to one approach, the metric may include a measurement of the amplitude of the sensor. According to another approach, the metric may include a measurement of the signal to noise ratio (SNR) of the sensor. According to yet another approach, the metric may include a measurement of the bit error rate (BER) of the sensor.

In embodiments where more than one metric is acquired before operation, the metrics so acquired may be of the same type, e.g., where the metric is measured more than one time for purposes of accuracy, or of a different type.

The at least one metric is acquired before a particular operation is performed on the magnetic recording tape loaded per operation 806, e.g., before reading and/or writing per operation 813.

In one approach, the metric acquired before performing the operation may be acquired during manufacturing of the tape drive.

According to another approach, the metric acquired before performing the operation may be acquired by using design values, e.g., the design resistance, of one or more components of the tape drive.

The metric acquired before performing the operation according to yet another approach may also and/or alternatively be acquired before the operation with no intervening read and/or write operations.

According to yet another approach, the metric acquired before performing the operation may be acquired by performing an operation on a test magnetic recording tape in the tape drive. In such an embodiment, the test tape may preferably be known to be a non-sensor-damaging magnetic recording tape.

Operation 812 of method 800 includes storing the at least one metric in a drive memory of the tape drive. As will be described in greater detail elsewhere herein and/or become apparent in the descriptions of method 800, the at least one metric may be stored in a drive memory of the tape drive to provide a known comparison value and/or characteristic which may be later used to determine if a magnetic recording tape used in the tape drive is sensor-damaging. The term "sensor-damaging," as previously described, may describe a magnetic recording medium that has, or is highly likely to, cause head wear and/or shorting of the tape head.

Operation 813 includes instructing a read and/or write operation to be performed on the magnetic recording tape. The controller of the tape drive may provide the instruction, e.g., in response to receiving a read and/or write request from a host, library controller, etc.

As described elsewhere herein, a magnetic recording tape that includes one or more defects and/or an abnormally high abrasivity may cause undesirable wear to the tape head. Damage and/or undesirable wear may become apparent during or after the read and/or write operation of operation 813. Accordingly, operations 814-818 may be performed to determine if the magnetic recording tape caused damage and/or an undesirable amount of wear on the tape head, as will now be described by below.

Operation 814 includes acquiring a metric for at least one sensor of the tape drive after performing the operation (reading and/or writing) on the magnetic recording tape. Similar to the one or more metrics of operation 811, the metric(s) for at least one sensor of the tape drive acquired after tape drive operations occurred may, according to various embodiments, include any measurable metric.

It should be noted that although the metric may include any measurable metric, the metric may preferably include the same metric type as the metric of operation 811. Acquiring the same metric type as the metric acquired before the operation(s) occurred may enable a comparison to be made between the acquired metrics, e.g., to determine if the magnetic recording tape is sensor-damaging, as will be described below in the descriptions of operation 816.

According to some embodiments, the at least one metric may be acquired when the cartridge is unmounted, but while the cartridge is still in the tape drive. For example a metric acquired when the cartridge is unmounted, but while the cartridge is still in the tape drive may include a measure of the resistance of the associated sensor, i.e., the sensor associated with the measured resistance value.

According to other embodiments, the at least one metric may be acquired when the cartridge is mounted and while the cartridge is still in the tape drive. For example a metric acquired when the cartridge is mounted and while the cartridge is still in the tape drive may include an output metric, e.g., amplitudes, SNR, BER, etc., of the associated sensor.

According to a different embodiment, the at least one metric may be acquired after removing the cartridge from the tape drive.

According to yet another embodiment, the at least one metric may be collected and/or acquired during a latter portion of the read and/or write operation.

As for operation 811, operation 816 may include acquiring metrics that are data directly acquired from the data and/or servo channels, statistical data derived therefrom, averages, etc.

Operation 816 includes comparing the metric(s) for the at least one sensor after performing the operation to the metric(s) for the at least one sensor acquired before performing the operation. The comparison may be on a sensor by sensor basis, on groups of sensors, on metrics corresponding to the entire sensor array, etc. The metrics may be compared to determine if the magnetic recording tape caused an undesirable amount of wear and/or damage to the tape drive performing the read and/or write operation.

According to one embodiment, the magnetic recording tape may be determined to be sensor-damaging where the comparison of the metrics indicates that one or more of the sensors exhibit a significant drop in resistance as a result of the performing the operation on the magnetic recording tape. Such drop in resistance may be indicative of a defect on the magnetic recording tape causing a short in the tape head, e.g., by smearing conductive material across the read gap.

According to another embodiment, the magnetic recording tape may be determined to be sensor-damaging where the comparison of the metrics indicates that one or more sensors exhibit an increase in resistance as a result of performing the operation. The magnetic recording tape may be determined to be sensor-damaging in such an embodiment, as the increase in resistance may be indicative of the magnetic recording tape wearing the tape head.

Comparing the metric for the at least one sensor after performing the operation to the metric for the at least one sensor acquired before performing the operation may include comparing the difference between the metrics to a predetermined range, e.g., as will now be described below by decision 818.

Decision 818 includes determining if the comparison, e.g., see operation 816, indicates that the difference between the metrics is in a predetermined range, such as above or below a predetermined value, within a defined set of values, etc.

According to one embodiment, the predetermined range may be a track resistance that is 3 ohms greater than or equal to, or 3 ohms less than or equal to a resistance value stored in the cartridge memory field, e.g., obtained during operation 811.

According to another embodiment, the predetermined range may be a track resistance that is 5 ohms greater than or equal to, or 5 ohms less than or equal to a resistance value stored in the cartridge memory field.

According to yet another embodiment, the predetermined range may be a track resistance that is 10 ohms greater than or equal to, or 10 ohms less than or equal to a resistance value stored in the cartridge memory field.

In response to the result of the comparing indicating that a difference between the metrics is not in a predetermined range (e.g., as noted by the "NO" logic extending from decision 818) the magnetic recording tape may be determined to be not sensor-damaging. In response to such a determination being made, an indication that the magnetic recording tape is not sensor-damaging may be stored in the cartridge memory, in a library memory, etc.

In contrast, the comparing indicating that the difference between the metrics is in a predetermined range (e.g., as noted by the "YES" logic extending from decision 818) may indicate that the magnetic recording tape is sensor-damaging.

One or more actions may be taken in response to a result of the comparing indicating that the difference between the metrics is in a predetermined range. Such action may be taken to prevent the magnetic recording media that is determined to be sensor-damaging from damaging a tape drive, e.g., see operations 819-830 described below.

Decision 819 includes determining whether the magnetic recording tape should be burnished, or that an indication should be stored on the magnetic recording tape that the magnetic recording tape is sensor-damaging.

A determination may be made to store an indication that the magnetic recording tape is sensor-damaging for any suitable reason. For example, such a determination may be made by default, in response to a burnishing operation not being presently available, etc.

Optional operation 820 includes providing the cartridge memory field, e.g., in response to determining that storing an indicator that the magnetic recording tape is problematic is selected (e.g., as noted by the "Store Indication" logic extending from decision 819). Providing the cartridge memory field may allocate a location for the indication to be stored.

Operation 822 includes storing an indication that the magnetic recording tape is sensor-damaging. According to one embodiment, the indication may be stored in a memory, e.g., the provided cartridge memory field in the cartridge memory coupled to a cartridge housing of the magnetic recording tape. This problematic cartridge may then be prevented from being used in any other drives until the field in the cartridge memory is cleared, e.g., in response to performing corrective action.

Corrective action to clear this field may include running the tape through a special tape burnishing drive to blunt down asperities; running the tape in a sacrificial drive, e.g., for a full file pass, to reduce the protrusion of the tape particles; proceeding to decision 832, etc. Once the problematic tape has been properly burnished, the cartridge memory field may be cleared and the cartridge may be used again. The burnishing operations do not affect magnetics so no data is lost.

The stored indication may also and/or alternatively be used in the scheduling of such correcting action.

Referring again to decision 819, a determination may be made to burnish the magnetic recording tape (e.g., as noted by the "Burnish" logic extending from decision 819). Such a determination may be made for any reason. For example such a determination may be made in response to a burnishing operation being presently available.

In response to determining that burnishing is desirable, any of the foregoing corrective actions may be taken. For example, the process may proceed to decision 832 and the corresponding subsequent operations may be performed.

Though damage may have occurred to one or more of the sensors during performing method 800, tape drives may tolerate one or more shorted tracks, e.g., drives with six shorted tracks have been found to read and write at full capacity. Nonetheless, the processes described herein may minimize the incidences of shorting by quickly identifying cartridges with sensor-damaging tape so that the cartridge is no longer used until remedial action is performed. This in turn may desirably lead to extended drive life.

It should be noted that the memory field on the cartridge may be used to store data acquired during the operations and comparisons of method 800. For example, data acquired during the operations and comparisons may include, e.g., cartridge usage data, head shorting and/or wear data, output data, etc.

A history of one or more actions taken in response to a result of the comparing indicating that a difference between the metrics is in a predetermined range may also and/or alternatively be stored in the cartridge memory.

It should be noted that although not shown in method 800, a determination may be made as to whether or not the tape head has been damaged as a result of the read and/or write operation performed on the magnetic recording tape. For example, it may be determined the tape head is in need of repair or servicing in response to the result of the comparing indicating that the difference between the metrics is in the predetermined range. In response to determining that the tape head is in need of repair or servicing, an instruction for such corrective actions may be made.

According to some embodiments, because one or more defects of the magnetic recording tape may not pass over the tape head during the performed operation, any determination that the magnetic recording tape is not sensor-damaging may depend on further operations of the magnetic recording tape. Accordingly, an instruction to perform further tape drive operations with the magnetic recording tape, with corresponding comparisons, may be stored in the cartridge memory field.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for detecting sensor-damaging tape media, the method comprising:

instructing loading of a tape cartridge into a magnetic tape drive;

acquiring a metric for at least one magnetic sensor of the tape drive after the at least one magnetic sensor performs a data read operation on a magnetic recording tape of the tape cartridge for reading data from the magnetic recording tape;

comparing the metric for the at least one magnetic sensor after performing the data read operation to a metric for the at least one magnetic sensor acquired before performing the data read operation for determining whether the at least one magnetic sensor has been damaged during performing the data read operation; and taking an action in response to a result of the comparing indicating that a difference between the metrics is in a predetermined range.

2. The method as recited in claim 1, wherein the metrics include a measure of resistance of the associated magnetic sensor, wherein the resistance in the metric for the at least one magnetic sensor is measured after the tape cartridge is unmounted.

3. The method as recited in claim 1, wherein the metrics include measures selected from a group consisting of amplitudes, signal to noise ratio (SNR), bit error rate (BER) of the associated magnetic sensor acquired during the data read operation performed by the associated magnetic sensor.

4. The method as recited in claim 1, wherein the metric for the at least one magnetic sensor acquired before performing the data read operation is acquired during manufacturing of the tape drive and is unique to the tape drive.

5. The method as recited in claim 1, wherein the metric for the at least one magnetic sensor acquired before performing the data read operation is acquired before the data read operation with no intervening operations, wherein the metric acquired before performing the data read operation is acquired while the tape cartridge is unmounted, but while the tape cartridge is in the tape drive.

6. The method as recited in claim 1, wherein taking the action includes instructing burnishing of the magnetic recording tape.

7. The method as recited in claim 6, comprising causing an indication that the magnetic recording tape has been burnished to be stored in memory of the tape cartridge.

8. A computer-implemented method for detecting sensor-damaging tape media, the method comprising:

instructing loading of a tape cartridge into a magnetic tape drive;

acquiring a resistance-based metric for at least one magnetic sensor of the tape drive after the at least one magnetic sensor performs a data read operation on a magnetic recording tape of the tape cartridge;

comparing the resistance-based metric for the at least one magnetic sensor after performing the data read operation to a resistance-based metric for the at least one magnetic sensor acquired before performing the data read operation for determining whether the at least one magnetic sensor has been damaged during performing the data read operation thereby resulting in diminished reading capability; and taking an action in response to a result of the comparing indicating that a difference between the resistance-based metrics is in a predetermined range, the difference being in the predetermined range being indicative that the at least one magnetic sensor has been damaged during performing the data read operation,
wherein taking the action includes storing an indication that the magnetic recording tape is sensor-damaging.

9. The method as recited in claim 8, wherein the indication is stored in a memory coupled to a cartridge housing of the magnetic recording tape.

10. A computer program product for detecting sensor-damaging tape media, the computer program product comprising a computer readable storage medium having program instructions embodied therewith, wherein the computer readable storage medium is not a transitory signal per se, the program instructions executable by a processing circuit to cause the processing circuit to perform a method comprising:
acquiring a metric for at least one magnetic sensor of a tape drive after performing an operation on a tape cartridge, the magnetic sensor being configured to sense a data track on a magnetic recording tape of the tape cartridge;
comparing the metric for the at least one magnetic sensor after performing the operation to a metric for the at least one magnetic sensor acquired before performing the operation; and
taking an action in response to a result of the comparing indicating that a difference between the metrics is in a predetermined range.

11. The computer program product as recited in claim 10, wherein the metrics are measures of resistances of the associated magnetic sensor, wherein the resistance in the metric for the at least one magnetic sensor is measured after the tape cartridge is unmounted.

12. The computer program product as recited in claim 10, wherein the metrics include measures selected from a group consisting of amplitudes, signal to noise ratio (SNR), and bit error rate (BER) of the associated magnetic sensor acquired during a data read operation performed by the associated magnetic sensor.

13. The computer program product as recited in claim 10, wherein the metric for the at least one magnetic sensor acquired before performing the operation is acquired during manufacturing of the tape drive and is unique to the tape drive.

14. The computer program product as recited in claim 10, wherein the metric for the at least one magnetic sensor acquired before performing the operation is acquired before the operation with no intervening operations, wherein the metric acquired before performing the operation is acquired while the tape cartridge is unmounted, but while the tape cartridge is in the tape drive.

15. The computer program product as recited in claim 10, wherein taking the action includes instructing burnishing of a magnetic recording tape of the tape cartridge.

16. The computer program product as recited in claim 15, comprising causing an indication that the magnetic recording tape has been burnished to be stored in memory of the tape cartridge.

17. The computer program product as recited in claim 10, wherein the metric acquired before performing the operation is acquired by performing an operation on a different magnetic recording tape than a magnetic recording tape in the tape cartridge, wherein taking the action includes storing an indication that the magnetic recording tape in the tape cartridge is sensor-damaging.

18. The computer program product as recited in claim 17, wherein the indication is stored in a memory coupled to a cartridge housing of the magnetic recording tape.

19. The method as recited in claim 8, wherein the metrics include measures selected from a group consisting of amplitudes, signal to noise ratio (SNR), bit error rate (BER) of the associated magnetic sensor acquired during the data read operation performed by the associated magnetic sensor.

20. The method as recited in claim 8, wherein at least one of the metrics is acquired when the cartridge is unmounted, but while the cartridge is in the tape drive.

* * * * *